(12) United States Patent
Wu et al.

(10) Patent No.: US 11,067,745 B1
(45) Date of Patent: Jul. 20, 2021

(54) DISPLAY ASSEMBLY INCLUDING AT LEAST TWO DISPLAY DEVICES

(71) Applicant: SEAMLESS TECHNOLOGY INC., Taipei (TW)

(72) Inventors: I-Wei Wu, New Taipei (TW); Hsueh-Min Yin, Taipei (TW); Chih-Lung Hung, Taipei (TW)

(73) Assignee: SEAMLESS TECHNOLOGY INC., Taipei (TW)

( * ) Notice: Subject to any disclaimer, the term of this patent is extended or adjusted under 35 U.S.C. 154(b) by 0 days.

(21) Appl. No.: 16/933,117

(22) Filed: Jul. 20, 2020

(51) Int. Cl.
  *G02B 6/08* (2006.01)
  *F21V 8/00* (2006.01)
  *G02F 1/1333* (2006.01)
  *G02F 1/1335* (2006.01)

(52) U.S. Cl.
  CPC .............. *G02B 6/08* (2013.01); *G02B 6/0078* (2013.01); *G02F 1/13336* (2013.01); *G02F 1/133524* (2013.01)

(58) Field of Classification Search
  None
  See application file for complete search history.

(56) References Cited

U.S. PATENT DOCUMENTS

| | | | |
|---|---|---|---|
| 9,612,468 B1* | 4/2017 | Liu | G02F 1/133524 |
| 2010/0073641 A1* | 3/2010 | Han | G02B 26/005 |
| | | | 353/38 |
| 2011/0025594 A1* | 2/2011 | Watanabe | G02F 1/13336 |
| | | | 345/102 |
| 2011/0109535 A1* | 5/2011 | Watanabe | G02F 1/133526 |
| | | | 345/87 |
| 2011/0164200 A1* | 7/2011 | Watanabe | G02F 1/13336 |
| | | | 349/58 |
| 2011/0255301 A1* | 10/2011 | Watanabe | H04N 5/66 |
| | | | 362/558 |
| 2011/0279487 A1* | 11/2011 | Imamura | G09G 3/342 |
| | | | 345/690 |
| 2014/0037257 A1* | 2/2014 | Yang | G02B 6/08 |
| | | | 385/116 |
| 2014/0071657 A1* | 3/2014 | Sekiguchi | G09F 9/33 |
| | | | 362/97.1 |
| 2014/0218956 A1* | 8/2014 | Wu | G09F 9/35 |
| | | | 362/554 |
| 2014/0218959 A1* | 8/2014 | Wu | G09F 9/3026 |
| | | | 362/559 |
| 2014/0218960 A1* | 8/2014 | Wu | G02B 6/08 |
| | | | 362/559 |
| 2014/0218971 A1* | 8/2014 | Wu | G02B 6/08 |
| | | | 362/613 |

(Continued)

*Primary Examiner* — Jerry Rahll
(74) *Attorney, Agent, or Firm* — ScienBiziP, P.C.

(57) ABSTRACT

A display assembly includes at least two display devices and two image compensating elements at a juxtaposition of every adjacent two display devices. Each display device includes a front surface that is viewed by user. Each front surface defines a display area and a border area. Each image compensating element is on the front surface. Each image compensating element includes a first part and a second part independent from each other, the first part is closer to the border area than the second part. Each of the first part and the second part includes a plurality of light guiding channels extending along a direction from a light-incident surface toward a light-emitting surface.

10 Claims, 6 Drawing Sheets

(56) References Cited

U.S. PATENT DOCUMENTS

| | | | | |
|---|---|---|---|---|
| 2015/0091833 A1* | 4/2015 | Wu | ............... | G02F 1/133524 |
| | | | | 345/173 |
| 2015/0091953 A1* | 4/2015 | Wu | ............... | G09G 3/2007 |
| | | | | 345/690 |
| 2015/0092395 A1* | 4/2015 | Wu | ............... | G02B 6/0061 |
| | | | | 362/97.1 |
| 2015/0093086 A1* | 4/2015 | Wu | ............... | G02B 6/08 |
| | | | | 385/132 |
| 2015/0093087 A1* | 4/2015 | Wu | ............... | G02B 6/10 |
| | | | | 385/132 |
| 2015/0228209 A1* | 8/2015 | Yoo | ............... | G02B 17/006 |
| | | | | 359/839 |
| 2017/0094814 A1* | 3/2017 | Chin | ............... | G02B 6/00 |
| 2017/0094815 A1* | 3/2017 | Chin | ............... | G02B 6/08 |
| 2017/0322351 A1* | 11/2017 | Liu | ............... | G02B 5/04 |
| 2017/0371612 A1* | 12/2017 | Chin | ............... | G09G 3/3666 |
| 2019/0212964 A1* | 7/2019 | Wu | ............... | G06F 3/1446 |
| 2019/0213923 A1* | 7/2019 | Meng | ............... | G09G 3/20 |
| 2019/0317274 A1* | 10/2019 | Wu | ............... | G02B 6/06 |
| 2019/0317275 A1* | 10/2019 | Wu | ............... | G02B 6/08 |
| 2019/0318669 A1* | 10/2019 | Wu | ............... | G02B 6/0005 |
| 2020/0209456 A1* | 7/2020 | Wu | ............... | G09F 9/301 |

* cited by examiner

(Related Art)

FIG. 6

DISPLAY ASSEMBLY INCLUDING AT LEAST TWO DISPLAY DEVICES

FIELD

The subject matter herein generally relates to a display assembly including at least two display devices.

BACKGROUND

To present a large display, a plurality of display devices can be coupled together (spliced together) to achieve a single large display. Each display device has a display area in which a plurality of display pixels are arranged and a border area surrounding the display area. However, when several display devices are spliced together, the border areas appear as grids imposed over the full display image. Thus images presented to viewers have a non-continuous appearance.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

Figure 1:
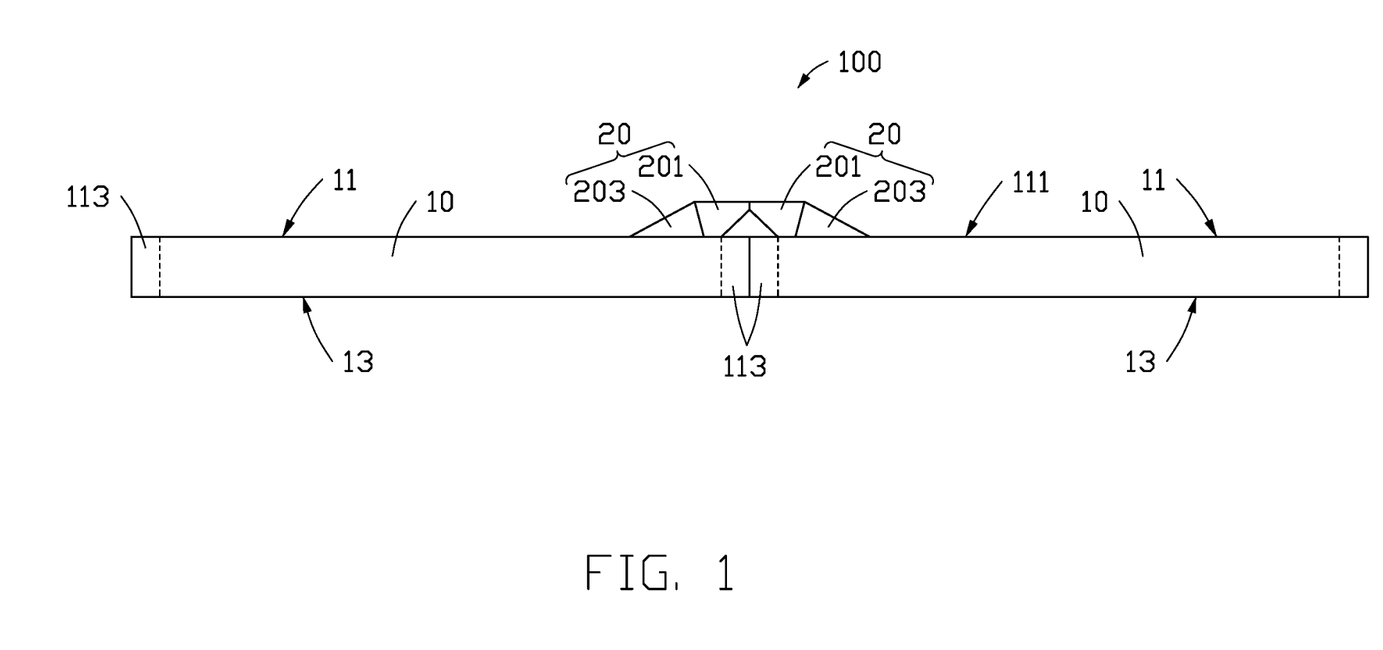
FIG. 1 is a top view of a display assembly according to an embodiment of the present disclosure.
Figure 2:
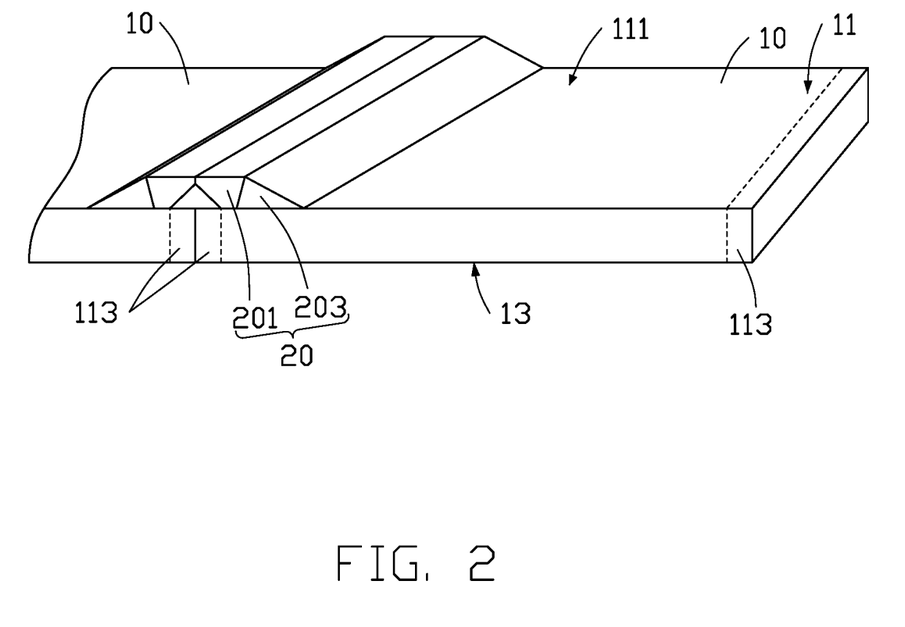
FIG. 2 is an isometric view of a portion of the display assembly of FIG. 1.

FIG. 1 and FIG. 2 illustrate a display assembly 100 of a first embodiment. The display assembly 100 includes two display devices 10 spliced together. In the present embodiment, the two display devices 10 are in a same plane. Each display device 10 includes a front surface 11 and a back surface 13 opposite to the front surface 11. The front surface 11 is viewable and may be touched by users. The front surface 11 defines a display area 111 for displaying images and a border area 113 outside the display area 111. The border area 113 surrounds the display area 111. In the present embodiment, the border area 113 is on both sides of the display area 111. The two front surfaces 11 of adjacent display devices 10 form an angle equal to 180 degrees. The two front surfaces 11 of the adjacent display devices 10 are in a same plane.

The number of the display devices 10 in the display assembly 100 is not limited to two, as long as the number of the display devices 10 is equal to or greater than two.

When adjacent display devices 10 are spliced together, the two border areas 113 of the two display devices 10 are at a juxtaposition of the two display devices 10. In the present embodiment, the two border areas 113 of the two display devices 10 are in contact with each other. In other embodiments, the two border areas 113 of the two display devices 10 may be spaced apart from each other, a small gap existing between the two border areas 113 of the two display devices 10.

As shown in FIG. 1 and FIG. 2, at least one image compensating component 20 is provided on the front surface 11 of each display device 10. The one or more image compensating components 20 enable a continuous or non-interrupted display by the display assembly 100, the border areas 113 of the display devices 10 not being visible. In other words, the border area 113 is not viewable in a combined image from the display devices 10. The image compensating component 20 can transmit portions of images such that the images from the display devices 10 are seamlessly spliced together to form a continuous and non-reticulated display. The display assembly 100 can thus display the combined image without interruption by the border areas 113.

As shown in FIG. 1 and FIG. 2, two image compensating elements 20 are positioned at a juxtaposition of adjacent display devices 10, and each image compensating element 20 is located on one display device 10. Each of the image compensating elements 20 is on the front surface 11, within the display area 111, and adjacent to the border area 113 of the display device 10. The image compensating element 20 is not in contact with the border area 113 of the front surface 11 but effectively overhangs and conceals the border area 113. In the present embodiment, a portion of the display area 111 that is not covered by the image compensating element 20 is defined as a main display area, and other portion of the display area 111 that is covered by the image compensating element 20 is defined as an infill display area. The infill display area is outside of the main display area.

As shown in FIG. 1 and FIG. 2 in the present embodiment, each image compensating element 20 includes a first part 201 and a second part 203 connected to the first part 201. The first part 201 is closer than the second part 203 to the border area 113. The two first parts 201 of the two image compensating elements 20 positioned at a juxtaposition of adjacent display devices 10 are coupled together and the two first parts 201 positioned at a juxtaposition of adjacent display devices 10 are located between two second parts 203 of the two image compensating elements 20. Both the first part 201 and the second part 203 of each image compensating element 20 are attached in the display area 111 of the front surface 11 of the corresponding display device 10.

Figure 3:
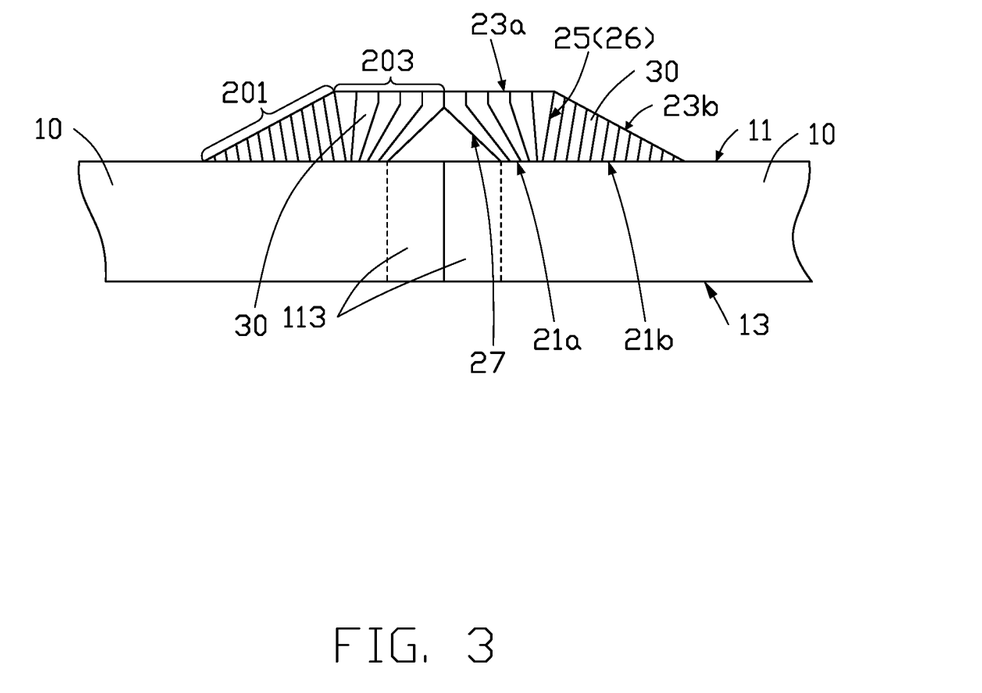
FIG. 3 is an enlarged view of a portion of the display assembly of FIG. 1.

As shown in FIG. 3, the first part 201 includes a first light-incident surface 21a attached to the front surface 11 of the display device 10, a first light-emitting surface 23a parallel to and opposite to the first light-incident surface 21a, and a first connecting surface 25 and a second connecting surface 27 between the first light-incident surface 21a and the first light-emitting surface 23a. The first connecting surface 25 and the second connecting surface 27 are opposite to each other. Each of the first light-incident surface 21a, the first light-emitting surface 23a, and the first connecting surface 25 is a flat surface. A shape of the second connecting surface 27 is not limited, it may be curved or include planes that are not coplanar. The first light-incident surface 21a covers the display area 111 of the front surface 11 of the display device 10 but does not cover the border area 113.

The first part 201 includes a plurality of light guiding channels 30. Light guiding paths of the light guiding channels 30 are independent of each other and extend along a direction from the light-incident surface 21a toward the light-emitting surface 23a. Each light guiding channel 30 extends non-linearly. The light guiding channels 30 are bundled together to form the first part 201. In one embodiment, each light guiding channel 30 is a light guiding fiber, and each light guiding fiber extends from the first light-incident surface 21a toward the first light-emitting surface 23a. In other embodiments, the light guiding fiber may be a plastic optical fiber, a quartz optical fiber, a glass optical fiber, or the like.

As shown in FIG. 3 in the present embodiment, the light guiding channels 30 of the first part 201 extend in a direction above the border area 113 and then bend such that an optical axis direction of the light guiding channel 30 at the first light-emitting surface 23a is at least substantially perpendicular to the first light-emitting surface 23a. A size of the area of the first light-incident surface 21a is less than that of the first light-emitting surface 23a. The first light-emitting surfaces 23a of the two first parts 201 are spliced to each other at the juxtaposition of two adjacent display devices 10. In this embodiment, the first light emitting surfaces 23a of the two first parts 201 are located on a same plane.

Referring to FIG. 3, the second part 203 is a triangular prism. The second part 203 includes a second light-incident surface 21b, a second light-emitting surface 23b, and a connecting surface 26 connecting each of the second light-incident surface 21b and the second light-emitting surface 23b. The second light-incident surface 21b, the second light-emitting surface 23b, and the connecting surface 26 define the three surfaces of the triangular prism. In the present embodiment, each second light-incident surface 21b, the second light-emitting surface 23b, and the connecting surface 26 are all flat surfaces. The second light-incident surface 21b covers the display area 111 of the front surface 11 of the display device 10 but does not cover the border area 113. The second light-emitting surface 23b intersects with the second light-incident surface 21b to form an acute angle. The connecting surface 26 intersects with the second light-incident surface 21b to form an acute angle.

In each image compensating element 20, the second part 203 is made so that the second part 203 can be closely attached to both the first connecting surface 25 of the first part 201 and the front surface 11 of the display device 10. The connecting surface 26 of the second part 203 is closely attached to the first connecting surface 25 of the first part 201, and the second light-incident surface 21b is closely attached to the front surface 11 of the display device 10. The second light-emitting surface 23b of the second part 203 and the first light-emitting surface 23a of the first part 201 are spliced to each other, and the second light-emitting surface 23b intersects with the first light-emitting surface 23a.

The second part 203 includes a plurality of light guiding channels 30. Light guiding paths of the light guiding channels 30 are independent of each other and extend along a direction from the second light-incident surface 21b toward the second light-emitting surface 23b. Each light guiding channel 30 extends linearly. The light guiding channels 30 are bundled together to form the second part 203. In one embodiment, each light guiding channel 30 is a light guiding fiber, and each light guiding fiber extends from the second light-incident surface 21b toward the second light-emitting surface 23b. In other embodiments, the light guiding fiber may be a plastic optical fiber, a quartz optical fiber, a glass optical fiber, or the like. The direction of extension of the light guiding channels 30 of the second part 203 is parallel to the connecting surface 26. The extending direction of the light guiding channels 30 of the second part 203 is inclined away from the border area 113.

Light from the main display area of the display device 10 is presented directly to the user, and the user can view all of the main display area. Light from the pixels of the infill display area of the display device 10 enters into the light guiding channels 27 from both the first light-incident surface 21a and the second light-incident surface 21b of the compensating element 20 and is emitted from the first light-emitting surface 23a and the second light-emitting surface 23b of the image compensating element 20. The juxtaposition of adjacent image compensating elements 20 renders the border areas 113 at the juxtaposition of adjacent display devices 10 effectively invisible, thus a viewer viewing the display screen of the display assembly 100 can enjoy an uninterrupted and seamless display. The image compensating element 20 extends images originating in the infill display areas of adjacent display devices 10 above the border areas 113, and the border areas 113 are shielded from view, thus a seamless display can be achieved. The image compensating elements 20 render overall images on the display devices 10 visually seamless.

Figure 6:
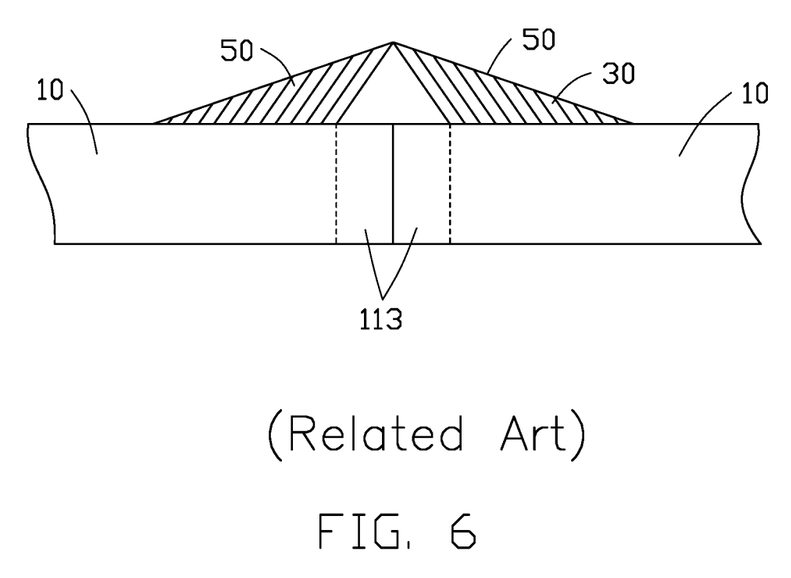
FIG. 6 is an enlarged view of a portion of a display assembly in related art.

As shown in FIG. 6, in a conventional image compensating element 50 (such as a light guiding fiber block) in the related art, the light guiding channels 30 extend linearly and the optical axis direction is generally inclined above the border area 113 to shield the border area 113. When a user views the entire display screen of the display assembly 100, a viewing angle with an optical axis skew occurs.

The present disclosure of image compensating element 20 solves the problem of inconsistent optical axis directions by providing independent first part 201 and second part 203. The extension direction of the light guiding channel 30 of the second part 203 is different from the extension direction of the light guiding channel 30 of the first part 201. The extension direction of the light guiding channel 30 of the second part 203 is inclined away from the border area 113. By adjusting the extension direction of the light guiding channel 30, the light emitting angles of the image compensating element 20 are adjusted and match with other display areas of the display device 10, improving the display effect of the display assembly 100.

Figure 5:
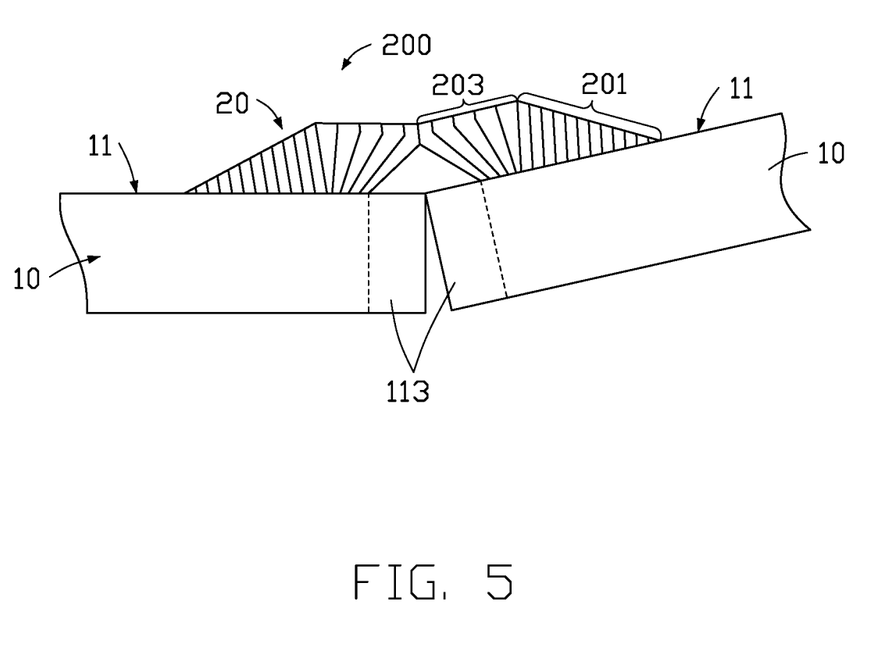
FIG. 5 is an enlarged view of a portion of a display assembly according to another embodiment of the present disclosure.

FIG. 5 illustrates a display assembly 200 of another embodiment. The display assembly 200 is basically the same as the display assembly 100 of the first embodiment; the display assembly 200 also includes two display devices 10 and two image compensating elements 20 at a juxtaposition of the two display devices 10. Each image compensating element 20 includes a first part 201 and a second part 203. In this other embodiment, structures and materials of both the first part 201 and the second part 203 are the same as those of the display assembly 100 of the first embodiment. The difference between the display assembly 200 and the display assembly 100 is that the two display devices 10 in the display assembly 200 are not located on a same plane, and the front surfaces of the two display devices 10 intersect to form an angle of fewer than 180 degrees. The number of display devices 10 in the display assembly 200 is at least two or more.

Figure 4:
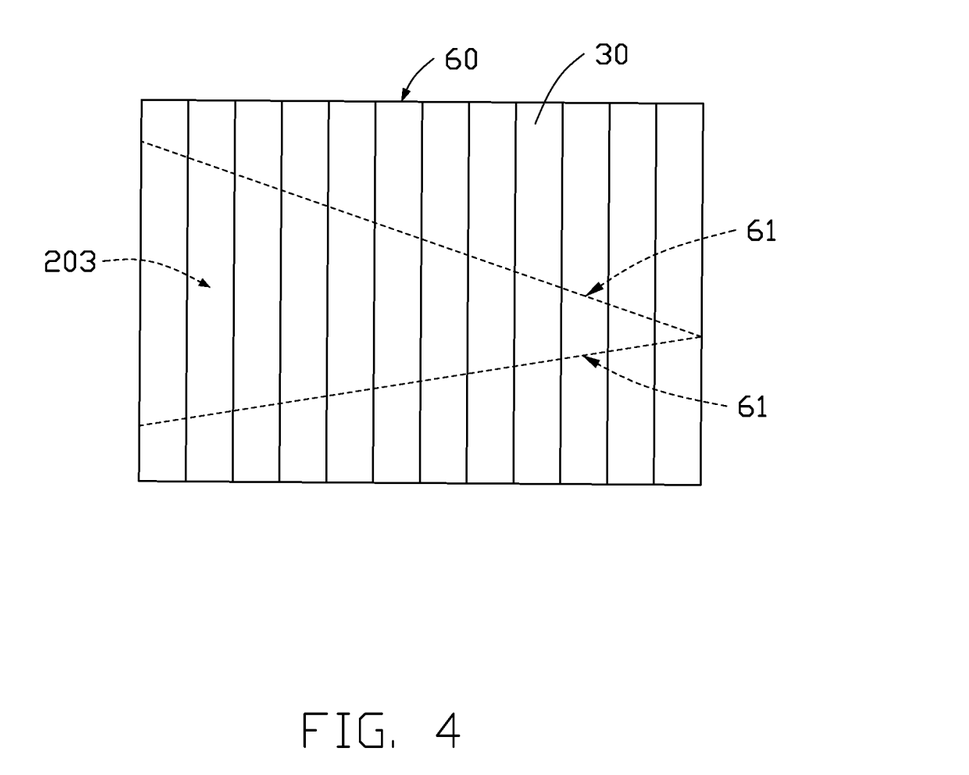
FIG. 4 is a view showing formation of a second part of the image compensating element.

In this disclosure, the second part 203 may be formed by cutting a light guiding fiber block 60 as shown in FIG. 4. The light guiding fiber block 60 includes a plurality of light guiding fibers 30 closely arranged and extending in a predetermined direction. The second part 203 can be obtained by cutting the light guiding fiber block 60 along two cutting positions 61, as shown in FIG. 4.

In this disclosure, the first part 201 may be formed by providing a light guiding fiber block 60, as shown in FIG. 4, and putting the light guiding fiber block 60 into an extrusion die (not shown). The light guiding fiber block 60 under a high temperature is extruded, so that the extending direction of the light guiding fiber becomes non-linear, the extruded light guiding fiber block then being cut to be a desired shape. The shape of the first part 201 is determined by the degree and range of extrusion, shaping, and cutting in the manufacturing process.

The display device 10 can be a liquid crystal display device, an organic light emitting diode display device, a micro-light emitting diode display device, and the like.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A display assembly, comprising:
    at least two display devices arranged side by side, each of the at least two display devices comprising a front surface adapted for displaying image, the front surface defining a display area and a border area outside the display area; and
    two image compensating elements at a juxtaposition of every adjacent two of the display devices, each of the two image compensating elements being on the front surface of a corresponding one of the adjacent two display devices;
    each of the image compensating elements comprising a first part and a second part independent from each other, the first part being closer to the border area than the second part;
    wherein the first part comprises a first light-incident surface attaching on the front surface and in the display area, a first light-emitting surface parallel to and opposite to the first light-incident surface, and a first connecting surface and a second connecting surface coupling between the first light-incident surface and the first light-emitting surface; the first connecting surface being opposite to the second connecting surface;
    wherein the first part comprises a plurality of light guiding channels; light guiding paths of the plurality of light guiding channels are independent from each other and extend along a direction from the first light-incident surface toward the first light-emitting surface;
    wherein the second part comprises a second light-incident surface attaching on the front surface and in the display area, a second light-emitting surface intersecting with the second light-incident surface, and a connecting surface coupling between the second light-incident surface and the second light-emitting surface; the connecting surface of the second part attaches on the first connecting surface; the second light-emitting surface and the second light-incident surface intersect to form an acute angle;
    wherein the second part comprises a plurality of light guiding channels independent from each other and extend along a direction from the second light-incident surface toward the second light-emitting surface; the direction of the light guiding channels of the second part is inclined toward a direction away from the border area.

2. The display assembly of claim 1, wherein the first light-emitting surfaces of the two image compensating elements at the juxtaposition of the adjacent two display devices are coupled together.

3. The display assembly of claim 1, wherein the first light-emitting surface and the second light-emitting surface in each image compensating element are coupled together.

4. The display assembly of claim 1, wherein each of the plurality of light guiding channels in each of the first part and the second part is a light guiding fiber.

5. The display assembly of claim 1, wherein each of the plurality of light guiding channels in the first part extends non-linearly.

6. The display assembly of claim 5, wherein each of the plurality of light guiding channels of the first part extends in a direction above the border area and then bends to extend so that an optical axis direction of the light guiding channel at the first light-emitting surface is perpendicular to the first light-emitting surface.

7. The display assembly of claim 1, wherein a size of an area of the first light-incident surface is less than that of the first light-emitting surface.

8. The display assembly of claim 1, wherein an extending direction of each of the plurality of light guiding channels of the second part is parallel to the connecting surface of the second part.

9. The display assembly of claim 1, wherein the front surfaces of the at least two display devices are arranged in a same plane.

10. The display assembly of claim 1, wherein two front surfaces of every adjacent two of the display devices intersects with each other at an angle of less than 180 degrees.

* * * * *